US009473246B2

United States Patent
Grobe et al.

(10) Patent No.: US 9,473,246 B2
(45) Date of Patent: Oct. 18, 2016

(54) METHOD AND TUNING DEVICE FOR TUNING A TUNABLE OPTICAL TRANSMITTER TO A PREDETERMINED TARGET WAVELENGTH

(71) Applicant: ADVA Optical Networking SE, Meiningen (DE)

(72) Inventors: Klaus Grobe, Planegg (DE); Michael Eiselt, Kirchheim (DE)

(73) Assignee: ADVA Optical Networking SE, Meiningen (DE)

( * ) Notice: Subject to any disclaimer, the term of this patent is extended or adjusted under 35 U.S.C. 154(b) by 2 days.

(21) Appl. No.: 14/704,046

(22) Filed: May 5, 2015

(65) Prior Publication Data

US 2015/0318930 A1  Nov. 5, 2015

(30) Foreign Application Priority Data

May 5, 2014 (EP) ..................................... 14001567

(51) Int. Cl.
*H04B 10/50* (2013.01)
*H04B 10/572* (2013.01)
(Continued)

(52) U.S. Cl.
CPC .......... *H04B 10/506* (2013.01); *H04B 10/572* (2013.01); *H04B 17/11* (2015.01); *H04J 14/02* (2013.01)

(58) Field of Classification Search
CPC .. H04B 10/506; H04B 10/572; H04B 17/11; H04J 14/02
USPC ........................................................... 398/79
See application file for complete search history.

(56) References Cited

U.S. PATENT DOCUMENTS 6,118,562 A * 9/2000 Lee ...................... H01S 5/0687
372/23
6,498,871 B1 * 12/2002 Kuboki ................ H04B 10/506
385/24
(Continued)

FOREIGN PATENT DOCUMENTS

EP     0529732 A1    3/1993
EP     2675089 A1    12/2013

OTHER PUBLICATIONS

Recommendation ITU-T G.989.1, 40-Gigabit-capable passive optical netwrorks (NG-PON2): General requirements, Mar. 2013, International Telecommunication Union.

*Primary Examiner* — Dalzid Singh
(74) *Attorney, Agent, or Firm* — The Culberson Group, P.C.

(57) ABSTRACT

A method for tuning a tunable optical transmitter to a target wavelength includes applying at least one tuning signal to the tunable optical transmitter to control the tunable optical transmitter to create an optical calibration signal according to nominal tuning information for the tunable optical transmitter. The optical calibration signal has a wavelength lying within a secure wavelength range, and the nominal tuning information is based on a nominal wavelength dependency for the tunable optical transmitter. The method also includes measuring a deviation between an actual wavelength dependency of the tunable optical transmitter and the nominal wavelength dependency, and determining calibration information based on that deviation. The calibration information is applied to determine a corrected nominal wavelength dependency from which target tuning information is determined. The tunable optical transmitter is controlled to create an optical channel signal according to the target tuning information.

20 Claims, 3 Drawing Sheets

(51) Int. Cl.
*H04J 14/02* (2006.01)
*H04B 17/11* (2015.01)

(56) References Cited

U.S. PATENT DOCUMENTS

| | | |
|---|---|---|
| 6,782,017 B1 | 8/2004 | Kai et al. |
| 2004/0013352 A1 | 1/2004 | Khayim et al. |
| 2011/0206384 A1 | 8/2011 | Zhou et al. |
| 2012/0106969 A1* | 5/2012 | Ogiwara .......... H04B 10/07957 398/79 |
| 2013/0163620 A1 | 6/2013 | Lecoeuche |
| 2014/0161457 A1* | 6/2014 | Ho ..................... H04B 10/40 398/79 |
| 2014/0233944 A1* | 8/2014 | Vetter ................. H04J 14/0282 398/34 |
| 2016/0080105 A1* | 3/2016 | Khotimsky ......... H04J 14/0232 398/34 |

* cited by examiner

METHOD AND TUNING DEVICE FOR TUNING A TUNABLE OPTICAL TRANSMITTER TO A PREDETERMINED TARGET WAVELENGTH

TECHNICAL FIELD OF THE INVENTION

The invention relates to methods for tuning a tunable optical transmitter of a given type out of a plurality of optical transmitters that are connected to a first end of an optical wavelength division multiplex (WDM) transmission link to a predetermined target wavelength, especially during a power-on procedure of the tunable optical transmitter. Further, the invention relates to tuning control devices for at least one tunable optical transmitter adapted to be used in an optical WDM system, the tuning control devices realizing the respective method, and to optical WDM systems including such a tuning control device.

BACKGROUND OF THE INVENTION

In optical wavelength division multiplex (WDM) passive optical networks (PONs) a plurality of optical network units (ONUs) are connected to a central node, also referred to as optical line terminal (OLT). PONs enable a bi-directional point-to-point (PtP) connection between each ONU and the OLT using dedicated optical channels, i.e. for each PtP connection a pair of downstream and upstream signals having predetermined optical wavelengths is used. In general, the downstream channel signal transmitted from the OLT to the respective ONU and the upstream channel signal transmitted in the reverse direction may have identical or different optical wavelengths. The plurality of downstream and upstream optical channel signals is transmitted as a respective combined downstream and upstream WDM signal within a WDM transmission link.

It is rather difficult to switch on a tunable optical transmitter, such as a tunable laser (in the following, the term "tunable laser" is equivalently used for any type of tunable optical transmitter), within an optical transmission system, such as a WDM system, wherein the optical transmission system does not allow the optical transmitter to start a sweep at an arbitrary wavelength. In such a WDM system, a plurality of optical wavelengths or optical channel signals in a given downstream or upstream transmission direction is combined via a coupler, a splitter or a combiner to an optical WDM signal. A wavelength insensitive coupler does not show any band filter properties with regard to each of the respective optical channel signals and thus the possibility exists that a channel signal of a laser that is switched on disturbs other channel signals or interferes with those, provided that this laser is not correctly tuned with regard to its wavelength. That is, if a newly added laser or a laser that has been switched off is switched on, and the laser wavelength (i.e. the center wavelength of the respective optical channel signal) does not lie with sufficient accuracy within the channel bandwidth that is dedicated to the respective optical channel signal, the respective optical channel signal may at least partly lie within the channel bandwidth of a neighboring optical channel. The same applies if during a tuning process of a tunable laser the laser wavelength is varied, e.g. swept over a predetermined interval, to such an extent that at least part of the optical spectrum of the optical channel signal lies within a neighboring optical channel bandwidth.

Such wavelength-independent couplers may especially be used in order to combine the optical channel signals created by a plurality of ONUs with a respective upstream optical WDM signal and to split the downstream optical WDM signal with respect to its optical power so that each ONU receives the full downstream WDM signal. Such a wavelength independent coupler may be part of a passive optical network defining PtP transmission links between the OLT and the ONUs. Of course, each ONU is configured to extract the desired optical channel signal from the downstream WDM signal, which is dedicated to the given PtP transmission link.

In many mass applications, low-cost tunable lasers will be required in the near future, especially at the consumer side of an optical WDM transmission system, i.e. within the ONUs. Owned dedicated wavelockers (WL) do not make such lasers any cheaper and an individual pre-calibration is expensive. However, as explained above, using, at one end of a WDM transmission link (especially the side of the ONUs of a PON), such low-cost tunable lasers, which cannot guarantee that the transmission wavelengths lie within the dedicated channel bandwidths with sufficient accuracy, in connection with a simple optical splitter for combining the plurality of optical channel signals to the respective (upstream) optical WDM signal causes the problem, that the optical signal created by such a low-cost laser may interfere with other channel signals already in use, if the optical signal does not lie within the dedicated optical channel bandwidth.

At the OLT, an arrayed waveguide grating (AWG) may be used for demultiplexing the received upstream WDM signal and for multiplexing the optical channel signals created by the OLT optical transmitters. Thus, the optical channel signal created by a tunable optical transmitter in the OLT and supplied to a dedicated channel port of the AWG is integrated into the downstream WDM signal, if the wavelength of the optical channel signal matches the dedicated channel bandwidth with sufficient accuracy, only. However, if a cyclic arrayed waveguide grating (CAWG) is used, for example to enable the use of different optical bands for the downstream and upstream optical channel signals, not only a downstream optical channel signal at the dedicated downstream channel bandwidth that is supplied to the respective channel port of the CAWG is output at the WDM port of the CAWG, but also an optical channel signal created by the same optical transmitter having a corresponding wavelength that lies in another order of the CAWG. If, in this case, the downstream optical WDM signal is combined with other downstream optical channel signals or WDM signals using a dedicated optical bandwidth, which overlaps with or comprise the bandwidth of the respective "other" order of the CAWG, interference between one of these channel signals and the channel signal of the laser to be tuned may occur, too, if the wavelength of the laser to be tuned is sufficiently far off the respective target wavelength, i.e. the center of the dedicated channel bandwidth.

The problems described above occur, for example, when a next generation PON 2 system (NG-PON2-system) is used, which has been defined by the responsible ITU committee (Recommendation ITU-T G.989.1), or when an NG-PON2 system is integrated in a more complex environment integrating an NG-PON2 system in an existing PON. An NG-PON2 system may be realized as a time and wavelength division (TWDM) PON part or a PtP WDM PON or as a combination thereof. The problems described above especially occur with transmission systems that do not work in burst mode, like TWDM systems do, but with WDM transmission systems that use a dedicated optical wavelength for continuously transmitting an optical signal created by an optical transmitter arranged at one end of the transmission link to an optical receiver arranged at the other end of the transmission link.

SUMMARY OF THE INVENTION

It is an object of the invention to provide methods and tuning control devices for tuning a tunable optical transmitter of a given type out of a plurality of optical transmitters that are connected to a first end of an optical WDM transmission link to a predetermined target wavelength, especially during a power-on procedure of the tunable optical transmitter. The tuning methods and devices operating in accordance with these methods guarantee that no other optical channels of the optical WDM system are disturbed while keeping the costs of the optical WDM system as low as possible. It is a further object of the invention to realize optical WDM systems which include such a tuning control device.

According to a first aspect of the invention, methods are applicable for tuning a tunable optical transmitter of a given type out of a plurality of optical transmitters that are connected to a first end of an optical WDM transmission link. These methods tune the tunable optical transmitter to a predetermined target wavelength, especially during a power-on procedure of the tunable optical transmitter. The tunable optical transmitter is controllable to create an optical signal having a predetermined wavelength according to tuning information which is supplied to the tunable optical transmitter through at least one tuning signal, and the tuning information comprises at least one parameter of the at least one tuning signal. Methods according to this aspect of the invention include a first step of controlling the tunable optical transmitter to create an optical calibration signal according to a nominal tuning information in such a way that the optical calibration signal has a wavelength lying within a secure wavelength range. The nominal tuning information is determined by using a known nominal wavelength dependency characterizing the wavelength dependency of the given type of tunable optical transmitter on the at least one parameter of the at least one tuning signal. The secure wavelength range is defined in such a way that it is broad enough to ensure that the wavelength of the optical calibration signal is included in the secure wavelength range, but the range does not comprise any optical channel wavelength range predefined for transmitting an optical channel signal in the direction of the optical calibration signal over the WDM transmission link. The methods further comprise the step of determining calibration information for the optical tunable transmitter by directly or indirectly measuring, within the secure wavelength range, a deviation between an actual wavelength dependency of the tunable optical transmitter and the nominal wavelength dependency. According to this first aspect of the invention, methods include a further step of controlling the tunable optical transmitter to create an optical channel signal according to target tuning information in such a way that the optical signal has a wavelength being equal to or lying, within predetermined acceptable tolerances, close to the target wavelength. The target tuning information is determined by using a corrected nominal wavelength dependency, the correction being effected by using the calibration information.

It is an idea of the invention that when switching on again an already existing optical transmitter or a newly added or integrated optical transmitter in an optical WDM system, in particular on the ONU side of an optical WDM system, the optical transmitter will show a switch-on-state with a wavelength of the generated signal lying in a secure wavelength range that is not used by the WDM system for transmitting optical channel signals during a normal operating state of the WDM system. Thus, a low-cost optical tunable transmitter may be used which cannot guarantee that the (center) wavelength of the optical signal created in the switch-on-state lies within the wavelength range of the respective dedicated optical channel of the WDM system with sufficient accuracy. Using such low-cost tunable transmitters was impossible when realizing a PtP WDM system as, during the switch-on-state, it would have been highly probable that the respective optical signal has a (center) wavelength such that the respective (narrow-band) optical spectrum of the optical signal interferes with the spectrum of another optical channel signal created by another optical transmitter.

Thus, according to the present methods, there is no need to use separately pre-calibrated and therefore expensive optical transmitters that work with a sufficiently high precision. The only information necessary is the nominal wavelength dependency for the given type of tunable optical transmitters, i.e. the dependency of the (center) wavelength of the optical signal created by a "statistically" average optical transmitter of the respective given type on the tuning information. The width of the secure wavelength range must, of course, be chosen in such a way that it can be guaranteed that the (center) wavelength of the optical calibration signal lies within the secure wavelength range when taking into account a maximum possible deviation of the actual wavelength dependency of the respective optical transmitter from the nominal wavelength dependency of the given type of optical transmitters. As the maximum possible deviation, a maximum tolerable deviation can be used when purchasing the optical transmitters, i.e. the low-cost optical transmitters can be chosen accordingly during a quality assurance process of incoming purchased optical transmitters. Of course, if the respective specification for the given type of optical transmitters guarantees that 100 percent of the optical transmitters match an acceptable maximum deviation from nominal tuning information, e.g. by performing a quality assurance process for manufactured optical transmitters before delivery, no quality assurance or selection at the purchaser's side is necessary.

The at least one tuning signal and the at least one parameter of the tuning signal may be adapted to control the optical center wavelength by controlling the temperature of the tunable optical transmitter and/or electronically controlling mechanical or other physical properties of the tunable optical transmitter, e.g. the selection of longitudinal modes by controlling the gain and the phase of the optical transmitter and/or the selection of supermodes by controlling the front and/or rear grating of a digital-supermode DBR laser.

Hence, such a tuning process during switching on, i.e. during activating or re-activating a tunable optical transmitter, is rather simple and cost-efficient to realize. Although existing tunable optical transmitters, such as tunable lasers, show complex multidimensional characteristics (i.e. the center wavelength and, to a certain extent, the form of the optical spectrum depends on multiple different tuning signals), with the invention at hand it becomes possible to use such tunable optical transmitters in complex WDM systems even if the actual wavelength dependency of a respective tunable optical transmitter is a priori unknown.

According to an embodiment of the invention, the calibration information is determined by directly or indirectly measuring a deviation between the actual wavelength of the optical calibration signal and a respective nominal wavelength which should have been achieved according to the nominal wavelength dependency. This deviation or wavelength difference can be used to correct the nominal wavelength dependency using an appropriated mathematical method and to determine the target tuning information from the corrected wavelength dependency. If the calibration information is determined for one single point of the nominal wavelength dependency only, the correction can at least easily be done by leaving all but one of the tuning signals or all but one parameters of a tuning signal constant and setting the remaining single tuning signal or parameter in such a way that the desired target wavelength is reached with sufficient accuracy.

According to a further embodiment of the invention, the calibration information is determined for at least two points of the nominal wavelength dependency, wherein the optical tunable transmitter is controlled, in succeeding steps, to create the optical calibration signal according to tuning information comprising a respective number of different values for the at least one parameter of the at least one tuning signal. In this case, a multi-dimensional correction is possible or the accuracy of a one-dimensional correction can be improved.

According to a another embodiment of the invention, the calibration information is determined by controlling the tunable optical transmitter, after having started to create the calibration signal with an initial wavelength that lies within the secure wavelength range, in such a way that at least one parameter of the tuning information is varied until the calibration signal reaches a predetermined actual wavelength and determining the deviation between the actual value of the at least parameter at which the predetermined wavelength has been reached and a respective nominal value of the at least parameter at which the predetermined wavelength should have been reached according to the nominal wavelength dependency.

The predetermined wavelength can be set by using an optical transmission band filter or another suitable means within the path of the calibration signal. The at least one tuning signal may in this case be varied until a maximum value is reached, indicating that the actual center wavelength of the calibration signal equals the center wavelength of the filter.

The calibration information may be determined by using a detection unit provided at a second end of the optical WDM transmission link, and the measurement results or information including processed measurement results are transmitted from the second to the first end of the optical WDM transmission link for controlling the tunable optical transmitter and/or for determining the calibration information. In this way, a single detection unit is sufficient to determine the calibration information or at least the measurement results that are required to obtain the calibration information in a subsequent step for any of a plurality of tunable optical transmitters provided at the first end of the optical WDM transmission link.

The detection unit may be provided within any optical path which at least guides the optical calibration signal. Of course, the whole optical WDM signal, which comprises all or at least some of the optical channel signals, may be split using an asymmetrical optical coupler, and a small portion (e.g. 1 to 3 percent) of the optical power of the optical WDM signal may be supplied to the detection unit. This is especially advantageous if the detection unit is also used in order to effect a fine tuning of the optical channel signal that is created after the calibration process. Such fine tuning may then be effected not only for the optical channel signal created by the tunable optical transmitter which has been calibrated and (re-) activated in the preceding step, but for any of the optical channel signals created by the optical transmitters provided at the first end of the optical WDM transmission link.

It is, however, also possible that the detection unit comprises a wavelength dependent optical splitter or an optical diplexer provided within the optical path of the optical WDM signal in order to separate any optical signal within the secure optical wavelength range or band and to supply any calibration signal to the detection unit. In this way, a relevant attenuation of the optical channel signals is avoided.

According to one embodiment of the invention, a fine tuning process is carried out after having controlled the tunable optical transmitter to create the optical channel signal. In this embodiment the fine tuning process comprises the step of, continuously, or in predetermined time intervals, or as a response to predetermined trigger events, maximizing the optical power of the optical channel signal created by the tunable optical transmitter by appropriately varying the tuning information.

For this purpose, an optical band filter property of an optical component, e.g. the band filter property of an optical demultiplexing device, like an AWG, can be used that is provided within the optical path of the respective channel signal or that is configured to extract the respective optical channel signal from the optical WDM signal. In this alternative, the simplest way is to maximize the optical power of an optical channel signal that is detectable within a designated optical path, i.e. an optical path in which the optical channel signal is present, only. In an embodiment in which the detection unit is also used to effect the fine tuning process, the detection unit receives the whole spectrum of the optical WDM signal. Thus, the detection unit may either have the ability to directly measure the actual wavelength of each selected optical channel signal or the detection unit may include an optical device which allows, for each selected optical channel signal, to collect information whether or not the actual wavelength equals the respective target wavelength, i.e. the respective designated center channel wavelength, with sufficient accuracy.

Generally speaking, the detection unit may not only be configured to detect the calibration information necessary to "calibrate" the respective tunable optical transmitter by correcting the nominal tuning information or the value of the at least one parameter of the at least one tuning signal, but also to detect fine tuning information that can be transmitted to the tuning information generating unit, which uses the fine tuning information to create suitable tuning information to be included in the at least one tuning signal for the tunable optical transmitter to be fine-tuned.

A second aspect of the invention includes a tuning control device for at least one tunable optical transmitter adapted to be used in an optical WDM system. The tuning control device comprises a detection unit and at least one tuning information generating unit. The at least one tuning information generating unit is configured to create tuning information comprising at least one parameter of at least one tuning signal which is supplied to a respective tunable optical transmitter, the tunable optical transmitter being configured to create an optical signal having a wavelength corresponding to the tuning information included in the at least one tuning signal created by the respective tuning information generating unit. The detection unit is adapted to determine a calibration information for the optical tunable transmitter by directly or indirectly measuring, within the secure wavelength range, a deviation between an actual wavelength dependency of the tunable optical transmitter and a nominal wavelength dependency for the given type of tunable optical transmitter, and to supply this calibration information to the at least one tuning information generating unit. The at least one tuning information generating unit and the detection unit are configured to carry out methods according to the invention described above for at least one tunable optical transmitter, wherein the at least one tuning information generating unit has access to or has stored the nominal tuning information for the at least one tunable optical transmitter. For storing the nominal tuning information, the tuning information generating unit may comprise a preferably non-volatile storage.

The detection unit may especially be adapted to measure the actual wavelength of an optical signal created by the at least one tunable optical transmitter or to gather information that can be used to determine the actual wavelength of the optical signal or to gather information that can be used to determine whether the actual wavelength of the optical signal lies within a narrow bandwidth of a narrow-band optical filter device comprised by the detection unit, and to supply this measurement information to the at least one tuning information generating unit, which uses this measurement information as calibration information. As stated above, this calibration information may be used to correct the nominal wavelength dependency and to create the at least one tuning signal that includes the respective target tuning information in such a way that the optical (channel) signal created by the tunable optical transmitter has a wavelength being equal to or lying, within predetermined acceptable tolerances, close to the target wavelength. Of course, the measure of correcting the nominal wavelength dependency includes the measure of correcting one or more values taken from the nominal wavelength dependency using the calibration information and using the corrected values for creating the at least one tuning signal such that it includes the desired target tuning information.

At this point it shall be mentioned that the tunable optical transmitter may, of course, be integrated in an opto-electronic component; especially, it may be part of an optical transceiver, which comprises respective optical, opto-electronic and electronic components that are required to receive an optical signal and to convert it into a corresponding electrical signal and vice versa. A transceiver may also comprise means to process the optical or electrical signal like optical filters or optical isolators or electronic means to perform a clock and/or data recovery process.

The tuning control device may be realized as a unit or as several units that are provided at the same place, e.g. within an ONU. However, this would require a separate tuning control device for each tunable optical transmitter (or transceiver unit) or each ONU. It is thus preferred to implement the tuning control device as distributed device comprising at least one tuning information generating unit provided at the place of the (at least one) tunable optical transmitter and a detection unit provided at a place at which the optical calibration signal of a plurality of tunable optical transmitters can be supplied to the detection unit. This is, of course, possible if the detection unit is provided in such a way that an optical tapped-off signal from the optical WDM signal of the optical WDM transmission link can easily be supplied to an input port of the detection unit. Especially, the detection unit may be located within an OLT or a central node of the WDM transmission system.

An optical WDM system according to a third aspect of the invention, which accomplishes the above-identified object, comprises a plurality of optical node units (ONUs) arranged at a first end of the optical WDM transmission link and at least one optical line terminal (OLT) arranged at a second end of an optical WDM transmission link, wherein the OLT and each ONU are adapted to establish a bidirectional communication between each of the ONUs and a respective selected channel port of the at least one OLT, each bidirectional communication being effected by using a pair of a selected downstream channel signal and a selected upstream channel signal. Each ONU comprises a first optical transceiver and the at least one optical line terminal comprises a plurality of second optical transceivers, each of the second optical transceivers defining a channel port of the at least one OLT, wherein at least one of the first optical transceivers or second optical transceivers comprises a tunable optical transmitter. The optical WDM system further comprises a tuning control device as described above adapted to control at least one of the tunable optical transmitters.

Of course, methods according to the invention may be applied to at least one of the first transceivers and/or to at least one of the second optical transceivers that comprises a tunable optical transmitter. In both alternatives, the detection unit may be provided at the second end of the WDM transmission link as both the downstream optical WDM signal comprising the optical channel signals created by the OLT transceivers and the upstream optical WDM signal comprising the optical channel signals created by the ONUs are present at this place and may therefore be supplied to a respective input port of the detection unit. Of course, two optical splitters or tapping-off means may be used for this purpose, namely a first optical splitter or tapping-off means for tapping-off the upstream optical WDM signal and a second optical splitter or tapping-off means for tapping-off the downstream optical WDM signal.

In an embodiment of the optical WDM system according to the invention, the tuning control device comprises at least one dedicated tuning information generating unit which is comprised by an optical transceiver unit comprising a respective dedicated tunable optical transmitter. That is, a transceiver module may be provided having the ability to perform the calibration or secure switch-on process according to the method of the invention on the basis of a calibration information supplied to the information generating unit.

According to another embodiment of the invention, the optical WDM system may comprise an optical splitter device provided at the first end of the optical WDM transmission link for connecting the plurality of ONUs to the optical WDM transmission link, wherein a common port of the optical splitter device is connected to the first end of the optical WDM transmission link and each of a plurality of splitting ports of the optical splitter device is connected to a selected ONU. Consequently, the WDM signal is split with respect to its optical power and is supplied to each of the ONUs. This makes it possible to select any of the ONUs as an end point of a PtP link for any of the channel ports of the OLT. For this, of course, the ONU must have the ability to selectively receive the downstream channel signal having the respective channel wavelength. This can be effected by using a (wavelength) tunable receiver for the transceiver of the ONU.

In a further embodiment, the optical WDM system according to the invention comprises a tapping unit arranged, at the first end of the optical WDM transmission link, within the optical path of an optical WDM signal comprising the optical calibration signal and channel signals that are created by the tunable transmitters of the first optical transceivers, wherein the detection unit is provided at the first end of the optical WDM transmission link and connected to a tapping port of the tapping unit.

In an optical WDM system according to the invention, the detection unit may be connected to or comprised within the at least one OLT. The respective first transceiver of the respective ONU is preferably directly connected to and may comprise the tuning information generating unit. The detection unit and the OLT can in this case be configured to transmit the calibration information to at least the ONU comprising the respective first transceiver and thus the tunable optical transmitter to be tuned. The respective first transceiver or the respective first receiver, respectively, are configured to receive the calibration information and to supply same to the tuning information generating unit.

In an embodiment of the optical WDM system according to the invention, the at last one OLT may further comprise a multiplexing and/or demultiplexing unit adapted to multiplex the downstream optical signals created by the second optical transceivers and/or to demultiplex the optical WDM signal, including the upstream optical signals created by the first optical transceivers, the multiplexing and/or demultiplexing unit defining the wavelengths or wavelength ranges of the optical channels for the downstream and upstream optical channel signals.

The multiplexing and/or demultiplexing unit may comprise an AWG having a plurality of channel ports and a WDM port, the WDM port receiving the upstream optical WDM signal and each of the channel ports supplying the respective upstream optical signal created by a dedicated first transceiver unit to the dedicated second optical transceiver. The same or a further AWG may be used for receiving the respective downstream optical signals created by the second transceivers at the channel ports and to supply the respective downstream optical WDM signal to the WDM transmission link at the WDM port.

If a single AWG is used for multiplexing the downstream optical signals and demultiplexing the upstream optical WDM signal, a cyclic AWG may be used having a given free spectral range between optical channels that are assigned to the same channel port and a given frequency spacing between respective neighboring optical channels. In this way, a single AWG can be used for performing the multiplexing and demultiplexing function even if different wavelengths are required for the pairs of wavelengths that are used for the bidirectional communication between each pair of dedicated first and second transceivers. The wavelengths of each pair of wavelengths are in this case spaced apart by the free spectral range of the cyclic AWG. If all optical channels possible shall be used, the single cyclic AWG may be a skip-zero (skip-0) AWG, i.e. an AWG having a free spectral range that equals N times the frequency spacing of neighboring channels (or channel ports), wherein N is the number of channel ports.

An example of a configuration comprising an 8-skip-0 AWG is the NG-PON2-system defined by Recommendation ITU-T G.989.1. In such an NG-PON2-system or any other WDM system comprising a simple power splitter for combining a plurality of channel signals, the method, device or system according to the invention is essential as such a simple multiplexer (which of course provides a broadcasting function in the respective other transmission direction or a free mapping of ONUs to the channel ports of the OLT by just controlling the tunable transmitter of the transceiver of the respective ONU to the dedicated channel defined by the AWG) provides no filtering property that assigns a dedicated channel wavelength to each of the ONUs. Of course, the method is also applicable in cases in which a multiplexing device is used that does provide a filtering or separation function for the channels to be multiplexed, if the filtering is incomplete, e.g. as is the case with a cyclic AWG. Here, it might happen that a tunable optical transmitter transmits at a wavelength of another order of the AWG, i.e. the actually transmitted optical channel signal reveals a wavelength that is an integer multiple times the free spectral range different from the expected wavelength. This wavelength might, however, be reserved for the channel port of another OLT that is dedicated to the same ONU, wherein the ONU might be configured to wavelength-selectively receive more than one downstream optical channel signal.

It is further to be noted that a WDM-PON may provide any other number of N channels. Thus, a respective multiplexing/demultiplexing device may be designed accordingly and being configured to multiplex/demultiplex an arbitrary number of N channel signals. A corresponding N channel AWG may be designed as N-sip-0 CAWG.

These and other advantages and features of the invention will be apparent from the following description of illustrative embodiments, considered along with the accompanying drawings.

DESCRIPTION OF ILLUSTRATIVE EMBODIMENTS

In the following, embodiments of the invention will be described with reference to an NG-PON2 WDM-PON as defined in the ITU Recommendation ITU-T G.989.1. However, as apparent to one familiar with the field of designing WDM transmission systems or networks, embodiments of the invention may be applied to any other type of a PON in which the above-identified problem in connection with the use of relatively low-cost and only coarsely calibrated optical transmitters arises.

Figure 1:
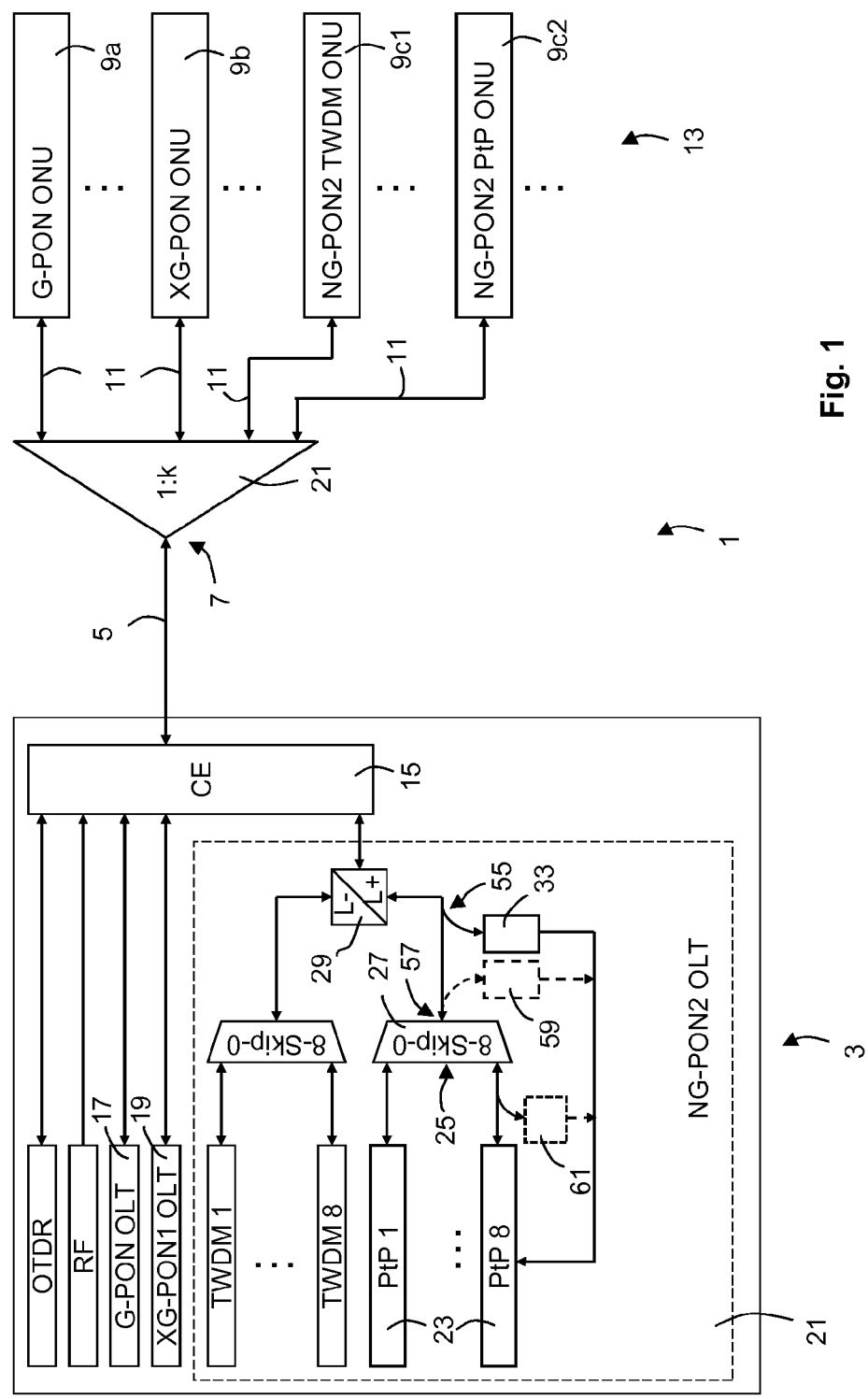
FIG. 1 shows a schematic block diagram of an NG-PON2 which has been integrated in an already existing PON comprising a tuning control device according to the invention for the PtP part of the NG-PON2.

FIG. 1 shows an optical WDM system in the form of a WDM-PON 1 according to a first embodiment of the invention. In general, a PON comprises at least one OLT at the central node side 3, which is connected via a WDM transmission link 5, e.g. an optical fiber, to a remote node (RN) 7, which is configured to connect a plurality of ONUs 9a, 9b, 9c1, and 9c2 to the RN 7 by a respective distribution link 11, e.g. an optical distribution fiber. The ONUs represent the customer side 13 of the PON 1. Of course, as shown in FIG. 1, the WDM transmission link 5 as well as the distribution links 11 may be realized as a single transmission medium that is used for both transmission directions, i.e. for the downstream transmission direction from the respective OLT to the ONUs and the upstream transmission direction from the respective ONU to the respective OLT. However, also dual fiber working may be used for these connections, that is, each transmission link 5, 11 may comprise two transmission media, e.g. optical fibers, each of which is used for a dedicated transmission direction.

The PON 1 in FIG. 1 comprises three different types of OLT, namely, a G-PON OLT 17, an XG-PON OLT 19 and NG-PON2 OLT 21. This is a typical example of a grown PON, wherein in subsequent steps a XG-PON has been integrated into an existing G-PON and the PON has then been extended by further integrating an NG-PON2. Of course, each of the sub-PONs comprises a respective OLT and a given number of ONUs as shown in FIG. 1. The G-PON comprises a given number of G-PON ONUs 9$a$, the XG-PON comprises a given number of XG-PON ONUs 9$b$ and the NG-PON2 comprises a given number of TWDM ONUs 9$c$1 and a given number of PtP ONUs 9$c$2.

The RN 7 is realized, according to the NG-PON2 specification, as a simple power splitter. This makes it possible to provide a broadcasting functionality by using a single downstream channel signal. Further, the RN 7 does not need to realize any wavelength dependency which facilitates its easy and cheap realization.

As the different sub-PONs use different optical wavelength bands, a wavelength dependent band combiner/separator filter device 15 is provided at the OLT side 3. Of course, the OLTs may be provided at the same location and can be (mostly mechanically) integrated into one unit. The band filter device 15 is configured to multiplex and demultiplex the channel signals or other signals, like OTDR signals, in the respective optical bands.

In such a complex optical WDM transmission system that rather densely occupies the available optical spectrum, it is problematic to use inexpensive tunable optical transmitters, which generally do not have a wavelocker and are coarsely calibrated, only. It is critical, with such inexpensive tunable optical transmitters, to effect wavelength jumps to the required wavelength slot, i.e. the dedicated optical channel. This is especially relevant when such a tunable optical transmitter is to be newly integrated in an existing PON, e.g. if a new customer, i.e. a new ONU, is to be added. If the coarse wavelength dependency, e.g. the nominal wavelength dependency for this given type of tunable optical transmitters, is known, only, there is the risk that the actual tunable transmitter has an actual wavelength dependency that considerably differs from the nominal wavelength dependency according to the specification of the given type of transmitters. In this case, using tuning information taken from the coarse or nominal wavelength dependency in order to cause the tunable optical transmitter to transmit at a desired target wavelength may result in an actual wavelength of the optical signal created that interferes with another channel signal already in use.

The invention thus provides methods and devices for at least coarsely specifying the tuning behavior of a tunable optical transceiver, for which a nominal wavelength dependency is available, "on the fly". This allows to calibrate such a selected tunable optical transmitter when it has already been installed in a WDM transmission system 1 as shown in FIG. 1.

Although the invention will in the following be described in connection with an NG-PON2 system, it will be apparent to those familiar with optical transmission systems that the methods and devices will also be useful in any other type of optical WDM transmission system or any other optical transmission system that requires to tune a tunable optical transmitter to a target wavelength with a desired accuracy without the risk that the wavelength of the optical signal created is swept through any other wavelength range in which the optical signal leads to intolerable effects, e.g. an interference with already existing optical signals at wavelengths within this occupied wavelength range.

This must especially be guaranteed if the optical signals already existing in the respective wavelength range are used for PtP transmission links, as is the case for the PtP part of the NG-PON2 system comprised by the WDM-PON shown in FIG. 1. Such PtP transmission links are given between each NG-PON2 PtP ONU 9$c$2 and each of dedicated OLT ports PtP1 to PtP8 of the NG-PON2 OLT 21. Over these transmission links, respective downstream and upstream channel signals are continuously transmitted. Thus, unlike in the TWDM transmission links of the NG-PON2 system, which are given between the NG-PON2 TWDM ONUs 9$c$1 and the TWDM ports TWDM1 to TWDM8 of the NG-PON2 OLT, it is impossible to choose a free time slot for effecting a jump of a tunable optical transmitter to a desired target wavelength, if it cannot be guaranteed that the wavelength does not touch other occupied ranges of the optical spectrum that are already in use for other transmission links.

The PtP ports of the NG-PON2 OLT 21 are defined by transceivers 23, wherein the output ports of the receivers 23, i.e. the respective OLT PtP ports, are connected to respective channel ports of a multiplexing/demultiplexing device 25 that is configured to multiplex the downstream channel signals created by the transceivers 23 and to demultiplex the upstream channel signals created by the NG-PON2 PtP ONUS 9$c$2. The multiplexing/demultiplexing device 25 is realized by an 8-skip-0 AWG 27 defining an output port or WDM port that is connected to an optical diplexer device 29, which separates the optical bands that are used for the TWDM part and the PtP part of the NG-PON2 system, respectively.

As explained above, an AWG (more specifically an m×1 AWG having m channel ports and a single WDM port) realizes a series of narrow-band optical band filters between each channel port and the WDM port, the center frequencies of neighboring filter bands having an essentially constant frequency spacing. Generally, an n-skip-m AWG is a cyclic AWG (CAWG) having a given periodicity designated as free spectral range, wherein n (neighboring) ports of at a maximum N ports possible within the same order of the free spectral range are used (i.e. connected to respective external ports) and m possible ports (m=N−n) are skipped. That is, an 8-skip-0 AWG is a cyclic AWG that uses all possible ports within the free spectral range and has periodicity. In other words, the 8-skip-0 AWG 25 has a free spectral range of eight times the frequency spacing.

Of course, instead of eight channel ports the multiplexer/demultiplexer device 25 could define any other number of channel ports. Further, the cyclic property of the multiplexer/demultiplexer device 25 is not mandatory. However, the cyclic property makes it possible to use the same multiplexer/demultiplexer device 25 if the downstream and upstream channel signals use different wavelength bands. In this case, the downstream wavelength and the upstream wavelength of each pair of downstream and upstream wavelength of a given PtP transmission link must be spaced by an integer multiple of the spectral periodicity of the multiplexer/demultiplexer device 25.

Figures 3, 4:
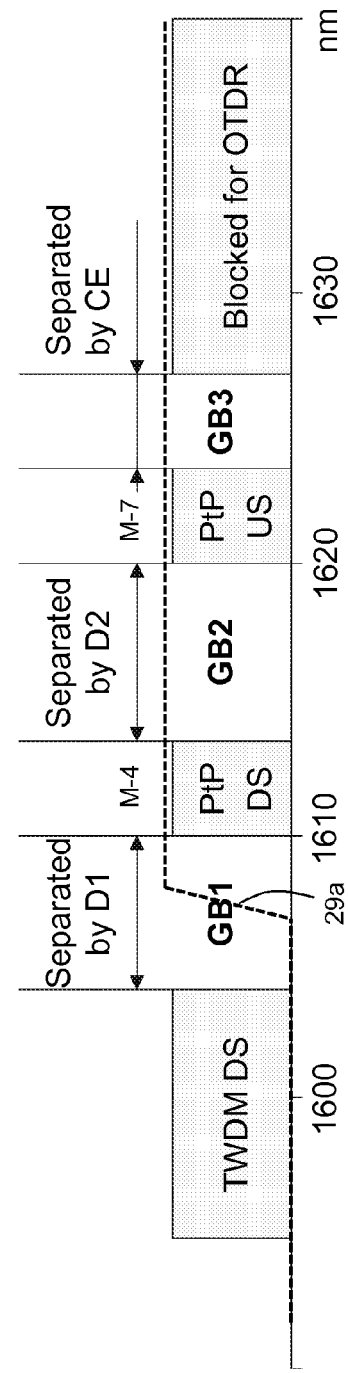
FIG. 3 shows a channel plan of the 8-Skip-0 CAWG used as a multiplexing/demultiplexing device in the WDM-PONs according to FIGS. 1 to 3.
FIG. 4 shows a schematic diagram illustrating the wavelength used by corresponding sub-systems of the WDM-PON according to FIG. 1.

FIG. 3 shows an exemplary channel plan of an 8-Skip-0 CAWG 27, which could be used for the PtP and TWDM part of the NG-PON2 sub-system of the WDM-PON in FIG. 1 and which matches the requirements of the respective ITU Recommendation ITU-T G.989.1 for the NG-PON2-system. Only the bands M-4 to M-7 of the orders 4 to 7 of the CAWG 27 are shown. The bands M-4 and M-7 are used for the downstream and the upstream channel signals for each PtP transmission link, respectively, as illustrated in FIG. 4, which shows a schematic diagram explaining the use of the optical spectrum between 1590 nm and 1640 nm by some of the sub-systems of the WDM-PON 1 according to FIG. 1. The spectral range below approximately 1604 nm is used for the TWDM downstream channels, respectively. The TWDM upstream channels are provided at lower wavelengths (not shown in FIG. 4). As apparent from FIG. 4, the wavelength range of the order 4 (channels M-4 in FIG. 3) of the 8-skip-0 CAWG 27 is used for the PtP downstream channels and the wavelength range of the order 7 (channels M-7 in FIG. 3) of the 8-skip-0 CAWG 27 is used for the PtP upstream channels of the NG-PON2 sub-system in FIG. 1. This channel plan also illustrates the typical property of the skip-0 CAWG 27, wherein the frequency spacing of 54 GHZ between the two neighboring channels at the border of two orders of the CAWG roughly equals the frequency spacing of approx. 50 GHz, i.e. the frequency spacing of the CAWG for neighboring channels within the same order, and wherein the free spectral range essentially equals 400 GHz, i.e. a value of eight times the frequency spacing of 50 GHz.

The wavelength ranges M-4 and M-7, i.e. the PtP downstream band and the PtP upstream band, are neighbored at both sides by a respective guard band, which are designated by GB1 (the guard band to the left of the PtP downstream band), GB2 (the guard band between the PtP downstream band and the PtP upstream band) and GB3 (the guard band to the right of the PtP upstream band). The wavelength range to the left of the guard band GB1 is used for the TWDM sub-system in FIG. 1 and the wavelength range to the right of the guard band GB3 is used for the OTDR monitoring sub-system in FIG. 1.

As apparent from FIGS. 4 and 1, the wavelength-dependent combiner/separator filter device 15, which is also designated as coexistence element (CE) used to combine the different sub-systems of the WDM-PON 1 in FIG. 1, is configured to separate, among others, the wavelength range used by the OTDR sub-system from the PtP upstream band M-7 of the NG-PON2 sub-system. The guard band GB3 is therefore defined to be broad enough to guarantee a safe separation of the wavelength bands M-7 and the OTDR wavelength band taking into account the filter characteristic, especially the slope of the filter characteristic of the filter device 15. Further, the filter device 15 is configured to combine the channel signals created by the TWDM transceivers and the PtP transceivers 23 comprised by the NG-PON2 OLT 21 and to separate the channel signals created by the TWDM ONUs 9c1 and the PtP ONUs 9c2 of the NG-PON2 sub-system.

The diplexer 29 combines and separates the channel signals created by the TWDM transceivers and the PtP transceiver of the NG-PON2 OLT 21 and the TWDM ONUs 9c1 and the PtP ONUs 9c2, respectively.

According to this channel plan and use of the wavelength ranges illustrated in FIGS. 4 and 4, the whole wavelength range comprising the TWDM downstream band, the guard band GB1, the PtP downstream band M-4 and the guard band GB2 is not in use for transmitting upstream channel signals created by any ONU of the various sub-systems of the WDM-PON 1 in FIG. 1. Therefore, this whole spectral or wavelength range, which is referred to as secure wavelength range, may be used for calibration purposes of a tunable optical transmitter comprised by an optical transceiver of a PtP ONU 9c2 at the customer side 13 of the WDM-PON in FIG. 1.

However, as the diplexer device 29 separates the wavelength bands used for the downstream and upstream channels of the TWDM and PtP part of the NG-PON2 sub-system, an optical calibration signal $S_{cal}$ created by a respective PtP ONU 9c2 should lie within the wavelength range that is confined, with respect to lower wavelengths, by the filter characteristic of the diplexer device 29, which is illustrated by the reference sign 29a in FIG. 4, and, with respect to higher wavelengths, by the wavelength range of the PtP upstream band M-7.

Thus, for the embodiment shown in FIG. 1, the secure wavelength range may cover the range between the rising slope of the filter characteristic 29a of the optical diplexer device 29, which is effective for the transmission of optical signals from a WDM port of the diplexer device 29 that is connected to the WDM transmission link to the split port of the diplexer device 29 that is connected to the WDM port of the CAWG 25, and the lower border of the PtP upstream band M7. Of course, for safety reasons, the upper border of the secure wavelength range should keep a sufficient safety distance from the lower border of the PtP upstream band M7.

A secure wavelength range, which is confined with respect to the lower border as described above, is to be applied, if an optical calibration signal $S_{cal}$ created by a PtP ONU 9c2 is detected and, as the case may be, evaluated at the OLT side 3 of the WDM-PON 1 according to FIG. 1 by a detection unit 33. If the partial WDM signal that is present in the optical path between the WDM port of the diplexer device 29 and the respective band port of the filter device 15 is supplied to the input port of the information detection unit 33, a broader secure wavelength range is possible, which at least further includes the TWDM downstream band and the whole guard band GB1.

The respective optical partial WDM signal is tapped off from the respective main optical path by a suitable optical splitter, which is configured to supply a predetermined portion of the optical power of the partial WDM signal to the input port of the detection unit 33. The detection unit 33 is configured to obtain calibration information from the optical calibration signal, preferably by measuring or detecting the (center) wavelength or frequency of the optical calibration signal $S_{cal}$ received. The optical calibration signal $S_{cal}$ is comprised by the partial optical WDM signal which includes all PtP upstream channel signals supplied to the WDM port of the CAWG 25.

As the optical calibration signal $S_{cal}$ is created by the respective PtP ONU 9c2, which comprises a tunable optical transmitter 35 (FIG. 2) to be calibrated, in such a way that it has a wavelength within the secure wavelength range (i.e. the secure wavelength range is chosen to be broad enough by appropriately choosing the channel plan and the use of the wavelength spectrum by the WDM-PON), it does not interfere with other optical signals, especially optical PtP channel signals, travelling in the same direction.

Figure 2:
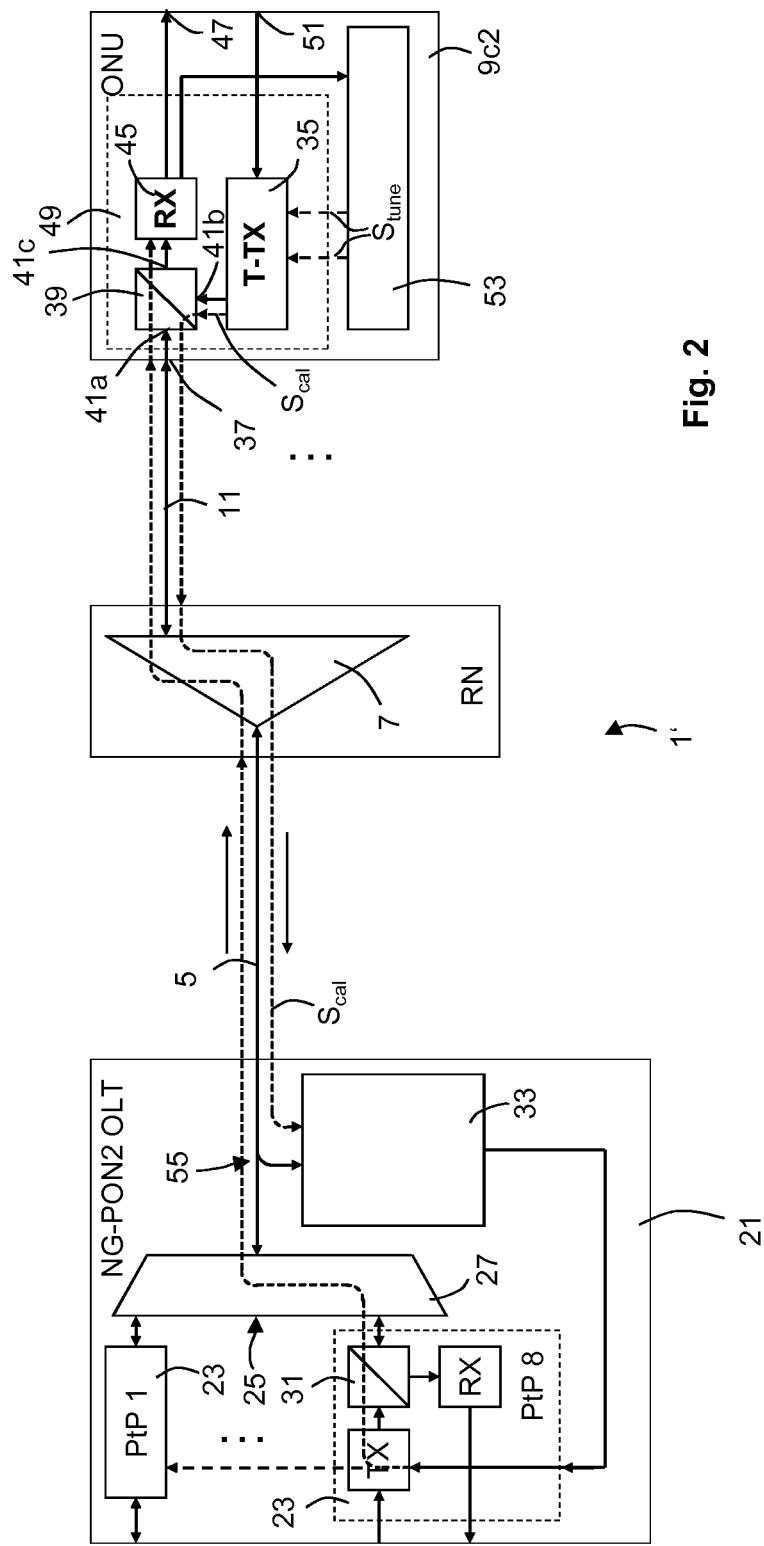
FIG. 2 shows a schematic block diagram of a WDM-PON which is comprised of a PtP part having a tuning control device according to the invention.

A PtP ONU 9c2 according to the embodiment in FIG. 1 may have a structure as illustrated in FIG. 2, which illustrates a WDM-PON 1' realized as "reduced" NG-PON2 having PtP ONU 9c2 and respective PtP OLT 21, only.

A remote port 37 of the ONU 9c2 is defined by a common port of a diplexer 39, which is adapted to combine and separate the optical paths for the receive signal created by the respective dedicated transceiver and directed to the ONU 9c2 and for the transmit signal or channel signal created by the ONU 9c2 which are created at wavelengths in different optical bands in the embodiment according to FIG. 2. However, the downstream and upstream channel signals may also lie within the same optical band, and each pair of optical downstream and upstream signals used for the same bidirectional communication may even use identical wavelengths. In these cases, the optical diplexer may be replaced by an optical circulator.

A first band port 41*b* of the diplexer 39 is connected to the tunable optical transmitter 35 of the ONU 9*c*2. The optical transmit signal created by the tunable optical transmitter 35 supplied to the band port 41*b* is thus output at the common port 41*a* and the remote port 37, respectively, as a respective upstream signal. The downstream signal created by a transceiver 23 of the NG-PON2 OLT 21, which is received at the remote port 37 and the common port 41*a*, respectively, is output at a second band port 41*c* of the diplexer 39 and supplied to a receiver 45. The receiver 45 is preferably a broad band receiver adapted to receive at least the respective dedicated downstream channel signal. The broad band property of the receiver 45 assures that the ONU 9*c*2 may be used for receiving and transmitting any downstream and upstream channel signals having the predefined wavelengths according to the downstream and upstream WDM channels of the WDM PON 1.

The tunable optical transmitter 35 is, of course, preferably configured to be able to transmit an optical signal at any wavelength in the range or band comprising the upstream channels predefined for the WDM-PON so that the ONU 9*c*2 may be flexibly used for establishing a bidirectional communication with any of the NG-PON2 OLT transceivers 23. Further, the tunable optical transmitter 35 is configured to be able to transmit an optical signal used as an optical calibration signal at a wavelength within the secure wavelength range, which, in general, will lie outside the wavelength range of the optical upstream channels of the WDM-PON, at least if the upstream channels are densely provided without the possibility of using a given range of the total wavelength range comprising the upstream channels as secure wavelength range.

The optical diplexer 39, the receiver 45 and the tunable optical transmitter 35 form, together with a control unit (not shown or comprised by the receiver 45 and/or the transmitter 35 in FIG. 2) a transceiver 49 of the NG-PON2 ONU 9*c*2. The control unit may be configured to perform signal processing for a channel signal received, e.g. to effect a clock and data recovery and/or a decoding or encoding or any other type of signal processing, for creating an output receive signal supplied to a local output port 47 of the ONU 9*c*2. Further, the control unit may be adapted to perform signal processing for a local transmit signal, supplied to a local input port 51 of the NG-PON2 ONU 9*c*2, e.g. a coding process. The control unit may be a separate unit or integrated within the optical receiver 45 and/or the tunable optical transmitter 35.

The NG-PON2 ONU 9*c*2 further comprises a tuning information generating unit 53, which is configured to create tuning information that is supplied to the tunable optical transmitter 35 by at least one electrical tuning signal $S_{tune}$. The at least one tuning signal $S_{tune}$ comprises at least one parameter, e.g. a current value for a heating unit of the tunable optical transmitter 35, which includes the tuning information causing the optical transmitter 35 to create an optical signal having a desired (center) wavelength. The nature of the at least one electrical tuning signal $S_{tune}$ and the respective at least one parameter depend on the specific optical transmitter. For example, more than one tuning signal may be required if the tunable optical transmitter 35 is a tunable digital supermode distributed Bragg reflector (DBR) laser or a modulated grating Y-branch laser, which are tunable over a wide optical band. The electrical tuning signals may be signals comprising at least one parameter (e.g. the current or voltage value) for controlling the phase or gain regions or DBR regions of a tunable laser having a respective design. Of course, additionally the temperature of such a laser may be controlled in order to effect a wavelength control.

The embodiment of a WDM-PON 1' illustrated in FIG. 2 is an NG-PON2 merely realizing PtP transmission links between the eight OLT transceivers 23 of an NG-PON2 OLT 21 and respective eight NG-PON2 ONUs 9*c*2. This embodiment may be regarded as part of the WDM-PON 1 shown in FIG. 1, wherein the optical filter device 15 and the diplexer 29 are omitted as no separation of optical bands for different parts of the WDM-PON is necessary.

As explained above, the tunable optical transmitter 35 is preferably realized without being fully pre-calibrated, as this requires a time consuming and expensive process. It is thus impossible to guarantee that the respective optical signal, especially the respective optical channel signal including the information comprised within the local transmit signal supplied to the ONU 9*c*2, is created, with sufficient accuracy, at the desired wavelength that has been assigned to the respective optical channel used by the ONU 9*c*2 and the corresponding NG-PON2 OLT transmitter 23, when the tunable optical transmitter is switched on for the first time. All that is required to be known is a general nominal tuning information valid for the respective type of tunable optical transmitters. This information is included in the manufacturer's specification for the respective type of tunable optical transmitters. The nominal tuning information comprises the wavelength dependency of the (center) wavelength on the one or more tuning signals or the one or more parameters of the tuning signals that are to be supplied to the tunable optical transmitter 35.

This nominal tuning information is used when activating the tunable optical laser 35 for the first time in order to carry out an individual calibration process or whenever a new calibration process shall be carried out in order to gather new calibration information.

As described above, in a first step of the calibration process, the at least one electrical tuning signal or the respective at least one parameter is created according to the nominal tuning information or nominal wavelength dependency, which may be stored in a preferably non-volatile storage of the tuning information generating unit 53 (not shown in the Figures). Of course, this information may also be supplied to the tuning information generating unit 53 by an external device using a suitable interface. The at least one electrical tuning signal is created in such a way that the tunable optical transmitter 35 should create an optical calibration signal $S_{cal}$ at a (center) wavelength that lies, according to the nominal tuning information, within the secure wavelength range. To achieve this with the utmost certainty possible, the tuning signal is created in such a way that the nominal wavelength, according to the nominal tuning information, is in or near the center of the secure range so as to provide a maximum security distance from both sides limiting the secure wavelength range. In general, the tuning signal may be created taking into account a maximum error information, i.e. a maximum admissible deviation of the wavelength actually created by an optical transmitter 35 of this type from the nominal wavelength that should have been created using a given nominal tuning information.

Thus, the optical calibration signal $S_{cal}$ that is created using the nominal tuning information has a wavelength within the secure wavelength range. Therefore, the optical calibration signal $S_{cal}$ does not interfere with any other optical channel signal created by any other ONU 9c2 in the WDM-PON 1' according to FIG. 2 or with any other ONU 9a, 9b, 9c1 or 9c2 according to the embodiment in FIG. 1.

The tuning control device in the embodiments according to FIGS. 1 and 2, respectively, comprises, for each ONU 9c2, a respective tuning information generating unit 53 and the commonly used detection unit 33. The detection unit 33 receives, via an optical power splitter 55 provided in the optical path of the WDM transmission link 5, a small portion of the optical power of the upstream optical WDM signal. Thus, not only the optical upstream channel signals created by the ONUs are supplied to an input port of the detection unit 33, but also the calibration signal created by an ONU 9c2 that is operated in a calibration mode.

The optical power splitter 55 may also be a wavelength-dependent optical power splitter adapted to pass through all optical upstream channel signals revealing wavelengths defined for the WDM upstream channels and to tap off all wavelengths lying in the secure wavelength range. In this case, the calibration signal is not (further) guided to the receiving OLT transceivers 23 of the OLT 21. Thus, there is no need to configure the multiplexing/demultiplexing device 25 in such a way that the calibration signal is blocked from being received by the broad-band receivers comprised by the transceivers 23.

The calibration signal $S_{cal}$ may include information detectable by the detection unit 33 concerning the ONU 9c2 that has created the calibration signal. This information may be included in a low-frequency pilot tone of an amplitude modulation of the respective calibration signal, so that the detection unit is able to identify which of the ONUs 9c2 has created a respective calibration signal $S_{cal}$. It is, of course, also possible to include the information concerning the origin of the calibration signal in any type of digital modulation of the calibration signal.

The detection unit 33 may comprise a (Fabry-Perot) etalon or a full optical spectrum analyzer or any other known device configured to measure the (center) wavelength of the calibration signal $S_{cal}$ or any other parameters or entities which can be used to determine the (center) wavelength of the calibration signal $S_{cal}$. This information determined by the detection unit 33 is supplied to the respective transceiver 23 of the NG-PON2 OLT 21, which transmits this calibration information to the ONU 9c2 that has created the calibration signal $S_{cal}$ by including this information into the respective downstream optical channel signal.

Having received this calibration information, the tuning information generating unit 53 may determine the deviation of the wavelength of the actually transmitted calibration signal and the wavelength that should have been created according to the nominal tuning information determined from the nominal wavelength dependency of the tunable optical transmitter 35. Of course, this deviation may also be determined by the detection unit 33 and transmitted as calibration information to the respective ONU 9c2, if also the unit 33 has knowledge of the nominal wavelength dependency of the tunable optical transceiver 35 used in the respective ONU 9c2.

The tuning information generating unit 53 may use the calibration information to determine target tuning information which assures that the tunable optical transmitter 35 transmits an optical signal at a target wavelength or at a wavelength sufficiently close to the target wavelength. In general, the target wavelength is the center wavelength of the optical WDM channel that is dedicated to the respective ONU 9c2.

The tuning information generating unit 53 may determine and store the corrected nominal wavelength dependency, e.g. a one- or multi-dimensional array or analytical function including the dependency of the wavelength on the one or more tuning signals or parameters of the tuning signals that are supplied to the tunable optical transmitter 35. In another embodiment, the tuning information generating unit 53 merely determines the respective target tuning information using the stored nominal wavelength dependency and the stored calibration information on request, i.e. in case target tuning information for generating a predetermined target wavelength is required.

In extreme examples, e.g. if a known type of tunable optical transmitters is used in all ONUs 9c2, the calculation and, as the case may be, the storage of the corrected wavelength dependency and the determination of the target tuning information may also be effected by the detection unit 33 (e.g. on request of the respective ONU). In other words, the functionality of the tuning information generating unit as regards the storage and/or determining the calibration information or target tuning information may either be fully realized in the ONU or in the OLT or distributed over both the ONU and the OLT.

Once the tunable optical transceiver 35 is activated to transmit at the target wavelength (preferably without sweeping the wavelength over a wavelength range used by other optical upstream channel signals), a fine tuning process may be carried out as known by a person skilled in the art. This process may be carried out once, continuously or on request. FIG. 1 shows, for each PtP transmission link, a further optical power splitter 57 and a fine tuning detection unit 59 provided in the optical path of the respective optical upstream channel signal. The fine tuning detection unit 59 is adapted to gather or determine information whether or not the respective upstream channel signal matches the center wavelength of the dedicated optical channel defined by the cyclic 8-skip-0 AWG 25 with sufficient accuracy or merely determines information concerning the optical power of the optical upstream channel signal actually created. This information is supplied to the respective transceiver 23 and transmitted to the dedicated ONU 9c2 as explained above in connection with the information concerning the calibration information.

The tuning information generating unit (53 in FIG. 2) may then use this information in order to fine-tune the wavelength to the desired target wavelength applying any suitable known method.

If the detection unit 33 comprises a full optical spectrum analyzer or an optical filter having the same filter properties as the multiplexing/demultiplexing device 25 (as regards the upstream signals), the fine tuning process may, of course, be carried out by using the detection unit 33 instead of additional fine tuning detection units 59.

It shall be noted that not only tunable optical transmitters in the ONUs may be calibrated using the above-explained method and devices. It is of course also possible to use such inexpensive tunable optical transmitters in the OLT transceivers 23. However, if a wavelength-sensitive multiplexing/demultiplexing device 25 is used in the OLT, the hazard of creating an optical downstream channel signal that interferes with other channel signals is already avoided by the properties of the multiplexing/demultiplexing device 25. However, if a cyclic multiplexing/demultiplexing device 25 like a cyclic AWG is used, it might happen that a not correctly calibrated tunable optical transmitter in an OLT transceiver 23 creates an optical signal that does not lie within the correct order of the multiplexing/demultiplexing device 25. If this is to be avoided (e.g. as the higher order channels are used for other purposes and/or by another transceiver connected to a further, but identical multiplexing/demultiplexing device), a corresponding calibration process and respective device can be implemented within the OLT 21.

In this case, it is possible to tap off the respective optical downstream signal from the optical path before the multiplexing/demultiplexing device 25 and to determine the calibration information necessary to correct the nominal wavelength dependency for the individual tunable optical transceiver.

The fine tuning may then be effected by using a further fine tuning detection unit 61, which receives an optical downstream channel signal tapped off in the optical path of the downstream optical WDM signal, as shown in FIG. 1.

In general, the method and device according to the invention mal also be integrated in a transceiver module including the detection unit 33 (which in this case is used to detect the single optical signal created by the respective tunable optical transmitter, only). However, in an WDM-PON it is preferred to use a centralized detection unit in order to save costs.

Irrespective of the detailed embodiment, the invention enables the use of low-cost, merely coarsely calibrated tunable optical transmitters within WDM systems by providing a method and device for calibrating the tunable optical transmitter with sufficient accuracy without interference with other channel signals (guided in the same direction) so that the tunable optical transmitter can be switched to a predetermined target wavelength with sufficient accuracy.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for tuning a tunable optical transmitter to a target wavelength, the tunable optical transmitter being included in a plurality of optical transmitters connected to a first end of an optical WDM transmission link, the method comprising:
   (a) supplying at least one tuning signal to the tunable optical transmitter to control the tunable optical transmitter to create an optical calibration signal according to nominal tuning information comprising at least one parameter of the at least one tuning signal, wherein
      (i) the optical calibration signal has a wavelength lying within a secure wavelength range which excludes any optical channel wavelength range predefined for transmitting an optical channel signal by another one of the plurality of optical transmitters in the direction of the optical calibration signal over the WDM transmission link, and
      (ii) the nominal tuning information is determined from a known nominal wavelength dependency characterizing the wavelength dependency of the tunable optical transmitter on the at least one parameter of the at least one tuning signal;
   (b) determining calibration information by directly or indirectly measuring, within the secure wavelength range, a deviation between an actual wavelength dependency of the tunable optical transmitter and the nominal wavelength dependency; and
   (c) controlling the tunable optical transmitter to create an optical channel signal according to target tuning information which is determined from a corrected nominal wavelength dependency corrected with respect to the nominal wavelength dependency based on the calibration information, the optical channel signal having a wavelength within a predetermined acceptable tolerance to the target wavelength.

2. The method of claim 1 wherein the calibration information is determined by directly or indirectly measuring a deviation between the actual wavelength of the optical calibration signal and a respective nominal wavelength which should have been achieved according to the nominal wavelength dependency.

3. The method of claim 2 wherein the calibration information is determined for at least two points of the nominal wavelength dependency, wherein the optical tunable transmitter is controlled, in succeeding steps, to create the optical calibration signal according to tuning information comprising a respective number of different values for the at least one parameter of the at least one tuning signal.

4. The method of claim 1 wherein the calibration information is determined by:
   (a) varying at least one parameter of the tuning signal applied to control the tunable optical transmitter until the optical calibration signal reaches a predetermined wavelength; and
   (b) determining the deviation between the actual value of the at least parameter at which the predetermined wavelength has been reached and a respective nominal value of the at least parameter at which the predetermined wavelength should have been reached according to the nominal wavelength dependency.

5. The method of claim 1 wherein the calibration information is determined using a detection unit provided at a second end of the optical WDM transmission link, and further including transmitting the measuring results or information including processed measuring results from the second end of the optical WDM transmission link to the first end of the optical WDM transmission link.

6. The method of claim 1 further including performing a fine tuning process after having controlled the tunable optical transmitter to create the optical channel signal, the fine tuning process comprising continuously or in predetermined time intervals or as a response to predetermined trigger events, maximizing the optical power of the optical channel signal created by the tunable optical transmitter by varying the tuning information supplied to the tunable optical transmitter.

7. A tuning control device for a respective tunable optical transmitter in an optical WDM system where the WDM system includes a plurality of optical transmitters connected to a first end of an optical WDM transmission link, the tuning control device including:

(a) a tuning information generating unit configured to
   (i) supply at least one first tuning signal to the respective tunable optical transmitter to control the respective tunable optical transmitter to create at least one optical calibration signal according to nominal tuning information comprising at least one parameter of the at least one first tuning signal, and
   (ii) supply at least one second tuning signal to the respective tunable optical transmitter to control the respective tunable optical transmitter to create an optical channel signal according to target tuning information, the optical channel signal having a wavelength within a predetermined acceptable tolerance to a target wavelength for the respective tunable optical transmitter;
(b) a detection unit configured to identify the wavelength of the at least one optical calibration signal;
(c) wherein the optical calibration signal has a wavelength lying within a secure wavelength range which excludes any optical channel wavelength range predefined for transmitting an optical channel signal by another one of the plurality of optical transmitters in the direction of the optical calibration signal over the WDM transmission link, and the nominal tuning information is determined from a known nominal wavelength dependency characterizing the wavelength dependency of the respective tunable optical transmitter on the at least one parameter of the at least one first tuning signal; and
(d) wherein the target tuning information is determined from calibration information which is obtained based on the wavelength of the at least one optical calibration signal identified by the detection unit.

8. The tuning control device of claim 7 wherein the calibration information is determined by directly or indirectly measuring a deviation between the actual wavelength of the optical calibration signal and a respective nominal wavelength which should have been achieved according to the nominal wavelength dependency.

9. The tuning control device of claim 8 wherein the calibration information is determined for at least two points of the nominal wavelength dependency, wherein the respective tunable optical transmitter is controlled, in succeeding steps, to create the optical calibration signal according to nominal tuning information comprising a respective number of different values for the at least one parameter of the at least one tuning signal.

10. The tuning control device of claim 7 wherein the calibration information is determined by:
   (a) varying at least one parameter of the first tuning signal applied to control the respective tunable optical transmitter until the calibration signal reaches a predetermined wavelength; and
   (b) determining the deviation between the actual value of the at least parameter at which the predetermined wavelength has been reached and a respective nominal value of the at least parameter at which the predetermined wavelength should have been reached according to the nominal wavelength dependency.

11. The tuning control device of claim 7 wherein the calibration information is determined using the detection unit provided at a second end of the optical WDM transmission link.

12. The tuning control device of claim 7 wherein the tuning information generating unit is configured to perform a fine tuning process after having controlled the respective tunable optical transmitter to create the optical channel signal, the fine tuning process comprising continuously or in predetermined time intervals or as a response to predetermined trigger events, maximizing the optical power of the optical channel signal created by the respective tunable optical transmitter by varying the tuning information supplied to the respective tunable optical transmitter.

13. An optical WDM system comprising:
(a) at least one optical line terminal arranged at a second end of an optical WDM transmission link;
(b) a plurality of optical node units arranged at a first end of the WDN transmission link, each respective optical node unit being connected to a respective channel port of the at least one optical line terminal so as to facilitate respective bidirectional communications between that respective optical node unit and the at least one optical line terminal, the bidirectional communication between a respective optical node unit and the at least one optical line terminal being effected with a respective downstream optical channel signal from the at least one optical line terminal to the respective optical node unit and a respective upstream optical channel signal from the respective optical node unit to the at least one optical line terminal;
(c) each optical node unit includes a respective first optical transceiver and the at least one optical line terminal includes a plurality of second optical transceivers, each of the second optical transceivers defining one of the channel ports of the at least one optical line terminal, at least one of the first optical transceivers or second optical transceivers including a tunable optical transmitter;
(d) a tuning information generating unit configured to
   (i) supply at least one first tuning signal to the tunable optical transmitter to control the tunable optical transmitter to create at least one optical calibration signal according to nominal tuning information comprising at least one parameter of the at least one first tuning signal, and
   (ii) supply at least one second tuning signal to the tunable optical transmitter to control the tunable optical transmitter to create a respective optical channel signal according to target tuning information, the respective optical channel signal having a wavelength within a predetermined acceptable tolerance to a target wavelength for the tunable optical transmitter;
(e) a detection unit configured to identify the wavelength of the at least one optical calibration signal;
(f) wherein the optical calibration signal has a wavelength lying within a secure wavelength range which excludes any optical channel wavelength range predefined for transmitting optical channel signals by another one of the optical transceivers in the direction of the calibration signal over the WDM transmission link, and the nominal tuning information is determined from a known nominal wavelength dependency characterizing the wavelength dependency of the tunable optical transmitter on the at least one parameter of the at least one first tuning signal; and
(g) wherein the target tuning information is determined from calibration information which is obtained based on the wavelength of the at least one optical calibration signal identified by the detection unit.

14. The optical WDM system of claim 13 wherein the tuning information generating unit comprises a dedicated tuning information generating unit included in an optical transceiver unit which includes the tunable optical transmitter.

15. The optical WDM system of claim 13 further including an optical splitter device provided at the first end of the optical WDM transmission link for connecting the plurality of optical node units to the optical WDM transmission link, the optical splitter device having a common port connected to the first end of the optical WDM transmission link and a plurality of splitting ports each connected to a respective one of the optical node units.

16. The optical WDM system of claim 13 wherein the tunable optical transmitter is included in one of the first optical transceivers and further including a tapping unit arranged at the second end of the optical WDM transmission link within the optical path of an optical WDM signal comprising the optical calibration and channel signals that are created by the tunable optical transmitter, and wherein the detection unit is provided at the second end of the optical WDM transmission link and is connected to a tapping port of the tapping unit.

17. The optical WDM system of claim 16 wherein the detection unit is connected to or comprised within the at least one optical line terminal and the respective first optical transceiver which includes the respective tunable optical transmitter is connected to the tuning information generating unit, and wherein the detection unit and the optical line terminal are configured to transmit the measurement information to at least the optical node unit comprising the respective first transceiver which includes the respective tunable optical transmitter to be tuned, and that respective first transceiver is configured to receive the calibration information and to supply the calibration information to the tuning information generating unit.

18. The optical WDM system of claim 13 wherein the at least one optical line terminal further includes a multiplexing and demultiplexing device configured to multiplex the downstream optical channel signals created by the second optical transceivers and to demultiplex the optical WDM signal including the upstream optical channel signals created by the first optical transceivers, the multiplexing and demultiplexing device defining respective optical channels for the downstream and upstream optical channel signals.

19. The optical WDM system of claim 18 wherein the multiplexing and demultiplexing device comprises at least one arrayed waveguide grating having a plurality of channel ports and a WDM port, the WDM port receiving the upstream optical WDM signal and each of the channel ports supplying the respective upstream optical channel signal created by a respective one of the first transceivers to a dedicated second optical transceiver.

20. The optical WDM system of claim 19 wherein the arrayed waveguide grating is a cyclic arrayed waveguide grating having a given free spectral range between the optical channels that are assigned to the same of N channel ports and a given frequency spacing between respective neighboring optical channels, the cyclic arrayed waveguide grating comprising a cyclic N-skip-zero arrayed waveguide grating having a free spectral range that equals N times the frequency spacing.

* * * * *